United States Patent
Tada

(10) Patent No.: US 10,796,418 B2
(45) Date of Patent: Oct. 6, 2020

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Junji Tada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 318 days.

(21) Appl. No.: 15/986,638

(22) Filed: May 22, 2018

(65) Prior Publication Data

US 2018/0350048 A1 Dec. 6, 2018

(30) Foreign Application Priority Data

May 31, 2017 (JP) ................................. 2017-107875

(51) Int. Cl.
*G06T 5/00* (2006.01)
*G06T 7/514* (2017.01)
(Continued)

(52) U.S. Cl.
CPC .............. *G06T 5/009* (2013.01); *G06T 5/008* (2013.01); *G06T 5/40* (2013.01); *G06T 5/50* (2013.01);
(Continued)

(58) Field of Classification Search
CPC .......... G06K 9/00234; G06K 9/00221–00261; G06T 5/009; G06T 5/008; G06T 5/40;
(Continued)

(56) References Cited

U.S. PATENT DOCUMENTS

| 2005/0271295 A1* | 12/2005 | Tabata | G06T 5/002 |
| | | | 382/274 |
| 2008/0212892 A1* | 9/2008 | Doida | G06T 5/009 |
| | | | 382/274 |
| 2017/0091594 A1* | 3/2017 | Yano | G06K 9/4652 |

FOREIGN PATENT DOCUMENTS

| JP | 10-232934 A | 9/1998 |
| JP | 2000-48184 A | 2/2000 |

(Continued)

OTHER PUBLICATIONS

Vidhya, M., S. Aji, and Masresha Beniam. "A classical method for detecting overlapping faces in images." 2016 International Conference on Computer Communication and Informatics (ICCCI). IEEE, 2016. (Year: 2016).*

(Continued)

*Primary Examiner* — Geoffrey E Summers

(74) *Attorney, Agent, or Firm* — Canon U.S.A., Inc. IP Division

(57) ABSTRACT

Provided is an image processing apparatus that detects a predetermined image region of an object from a photographed image; generates a correction parameter; and corrects a high-luminance region by using a correction parameter, in which, in a case where the high-luminance region is in an image region having a predetermined image region of a plurality of objects overlapping with each other therein, to which object having the predetermined image region the high-luminance region belongs is judged, and, on the basis of information of the predetermined image region the high-luminance region belongs to, the correction parameter with which the high-luminance region in the overlapping image region is corrected is generated.

14 Claims, 12 Drawing Sheets

(51) Int. Cl.
*G06T 5/50* (2006.01)
*G06T 7/90* (2017.01)
*G06T 5/40* (2006.01)

(52) U.S. Cl.
CPC .............. *G06T 7/514* (2017.01); *G06T 7/90* (2017.01); *G06T 2207/10024* (2013.01); *G06T 2207/20012* (2013.01); *G06T 2207/30088* (2013.01); *G06T 2207/30201* (2013.01)

(58) Field of Classification Search
CPC ............ G06T 5/50; G06T 2207/30201; G06T 2207/30088; G06T 7/90; G06T 2207/10024; G06T 7/514; G06T 2207/20012
USPC ........................................ 382/254, 274, 275
See application file for complete search history.

(56) References Cited

FOREIGN PATENT DOCUMENTS

JP 2005-327009 A 11/2005
JP 2012-078770 A 4/2012

OTHER PUBLICATIONS

Hoiem, Derek, et al. "Recovering occlusion boundaries from a single image." 2007 IEEE 11th International Conference on Computer Vision. IEEE, 2007. (Year: 2007).*

Wu, Bo, and Ram Nevatia. "Detection and segmentation of multiple, partially occluded objects by grouping, merging, assigning part detection responses." International journal of computer vision 82.2 (2009): 185-204. (Year: 2009).*

\* cited by examiner

|  | DEGREE OF RELIABILITY B |
|---|---|
| ALL ORGANS ARE ABLE TO BE DETECTED | 100 |
| THERE IS ORGAN WHICH IS NOT ABLE TO BE DETECTED | 70 |

IMAGE PROCESSING APPARATUS, IMAGE PROCESSING METHOD, AND PROGRAM

BACKGROUND

Field of the Disclosure

The present disclosure relates to an image processing apparatus that performs processing for an image, for example, an image which has been captured, an image processing method, and a program.

Description of the Related Art

A technique by which correction is performed for a high-luminance region of an object in a photographed image has been known conventionally. With the technique, it is possible to obtain a desirable image by correcting a shine region on a face which is generated, for example, due to environmental light.

Moreover, for example, Japanese Patent Laid-Open No. 2005-327009 discloses a method of detecting a predetermined part of an object from an image and, on the basis of a detection result thereof, correcting a shine region. With the aforementioned technique, each of a face and organs such as eyes and a mouth is detected as the predetermined part of the object, and a degree of correction for each pixel is determined on the basis of positions, colors, or the like of the organs. Thereby, for a part in which luminance or brightness does not need to be reduced, it is possible to maintain the luminance or the brightness each of which is high, and it is possible to perform correction only for a part in which shine of a skin, luminance of which is desired to be reduced, is generated.

SUMMARY

An aspect of the invention includes: a detecting unit configured to detect a predetermined image region of an object from a photographed image; a generation unit configured to generate a correction parameter; and a correction unit configured to correct a high-luminance region by using a correction parameter, in which, in a case where the high-luminance region is in an image region having a predetermined image region of a plurality of objects overlapping with each other therein, the generation unit judges to which object having the predetermined image region the high-luminance region belongs, and generates, on a basis of information of the predetermined image region the high-luminance region belongs to, the correction parameter with which the high-luminance region in the overlapping image region is corrected.

Further features of the present invention will become apparent from the following description of exemplary embodiments with reference to the attached drawings.

DESCRIPTION OF THE EMBODIMENTS

Hereinafter, suitable exemplary embodiments of the invention will be described in detail on the basis of attached drawings.

First Exemplary Embodiment

Figure 1:
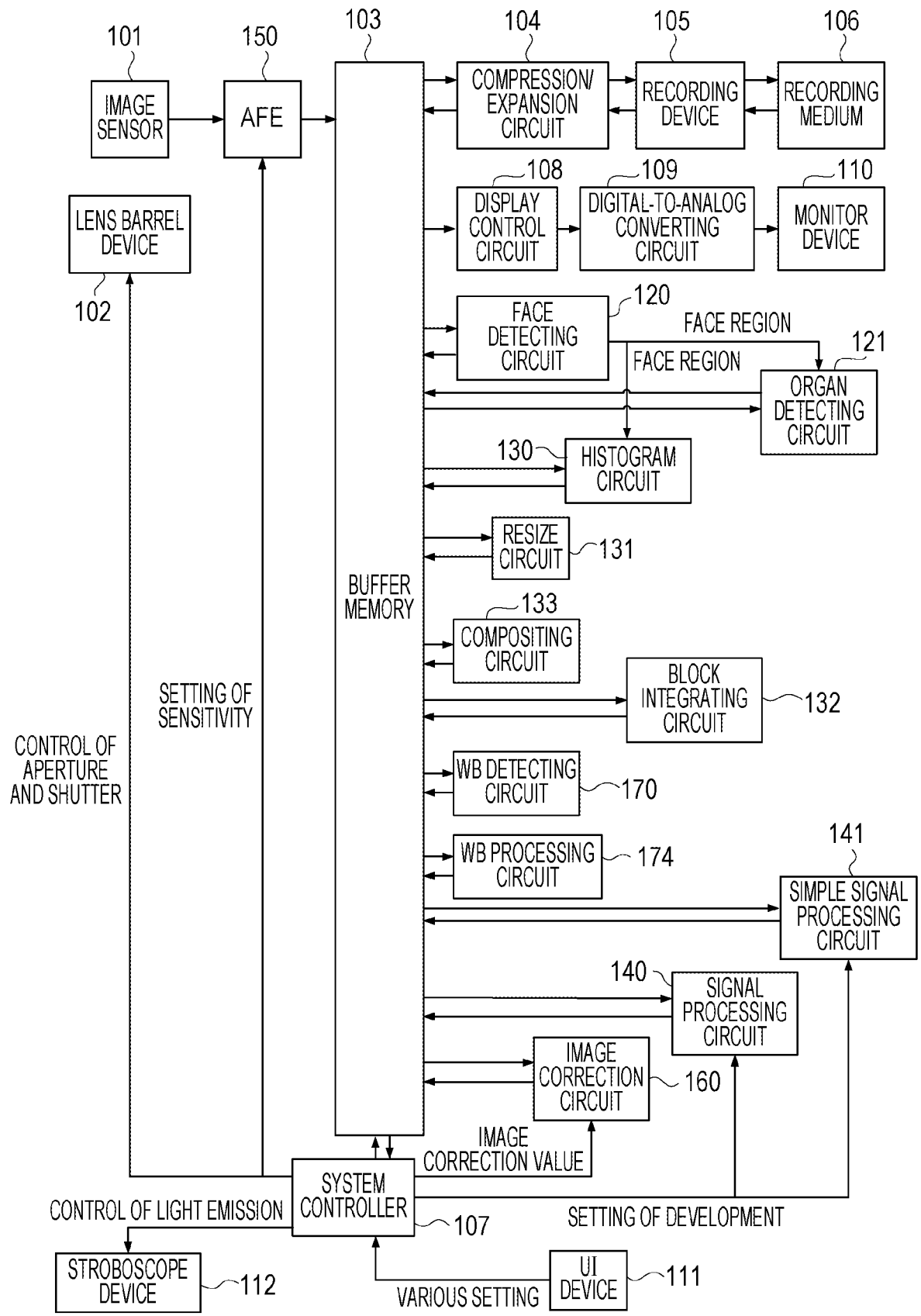
FIG. 1 is a view illustrating a configuration example of an image processing apparatus.

FIG. 1 is a block diagram illustrating a configuration example of an image capturing apparatus as an application of an image processing apparatus of the present exemplary embodiment. Examples of the image capturing apparatus include a digital still camera, a digital video camera, a smartphone and a tablet terminal each of which includes a digital camera function, various information terminals such as a personal computer, and various cameras such as an industrial camera, an onboard camera, and a medical camera.

In FIG. 1, when a photographing instruction is input by a user via a user interface (hereinafter, referred to as a UI device 111), a system controller 107 controls a lens barrel device 102, an image sensor 101, a stroboscope device 112, and the like to perform an operation of photographing an image.

The lens barrel device 102 includes a lens, an aperture, a mechanical shutter, and the like, and forms an optical image of an object or the like on an image sensing plane of the image sensor 101 at a time of photographing an image. The image sensor 101 is configured to include an image capturing device such as a CMOS or a CCD and a color filter composed of red (R), green (G), and blue (B), converts the optical image formed on the image sensing plane into an image signal by photoelectric conversion, and outputs the image signal to an analog front end circuit (hereinafter, referred to as the AFE circuit 150). The AFE circuit 150 performs gain adjustment and analog-to-digital conversion for the image signal of RGB, which has been output from the image sensor 101, and outputs the resultant as RGB data. The RGB data output from the AFE circuit 150 is temporarily stored in a buffer memory 103 as so-called RAW data.

Note that, in FIG. 1, transmission/reception of data or various types of information between the system controller 107 and the circuits is directly performed therebetween in some cases, but generally performed via the buffer memory 103. However, for simplification of description, even in a case where transmission/reception of data or various types of information is performed via the buffer memory 103, description for the buffer memory 103 via which the transmission/reception is performed is omitted in explanation below, except for a case where clear statement is particularly required.

After starting photographing an image, on the basis of a white balance (hereinafter, referred to as WB) mode which is set at a time of photographing the image or photographing conditions such as object luminance (Bv value) or photographing sensitivity, the system controller 107 calculates a WB detection setting value (white region detection setting value). Then, the system controller 107 sets the WB detection setting value for a WB detecting circuit 170. The WE detecting circuit 170 extracts, on the basis of the WB detection setting value, a white region from the RGB data (RAW data) accumulated in the buffer memory 103, and transmits information of the white region to the system controller 107. The system controller 107 calculates a WB coefficient on the basis of the information of the white region detected by the WB detecting circuit 170, and sets the WB coefficient for a WB processing circuit 174. On the basis of the WB coefficient, the WB processing circuit 174 performs WB processing by which WB of the RGB data (RAW data) accumulated in the buffer memory 103 is adjusted. The RGB data subjected to the WB processing is transmitted to a signal processing circuit 140 via the buffer memory 103.

Moreover, the system controller 107 sets a WB correction coefficient or an image processing parameter such as a gamma parameter for the signal processing circuit 140. The signal processing circuit 140 performs, for the RGB data subjected to the WB processing, signal processing based on the image processing parameter set by the system controller 107, and outputs YUV data of luminance (Y) and a color difference (U, V). In addition to noise reduction processing, gamma correction processing, gray level setting processing, color conversion processing, and signal processing such as generation of the YUV data, the signal processing circuit 140 in the present exemplary embodiment performs shine correction processing described below. The image processing parameter and the signal processing will be described in detail below. The YUV data subjected to the signal processing by the signal processing circuit 140 is temporarily stored in the buffer memory 103. Thereafter, the YUV data accumulated in the buffer memory 103 is used for, for example, recording, resizing processing, display, or the like.

For example, in a case where the YUV data is recorded, a compression/expansion circuit 104 reads out the YUV data accumulated in the buffer memory 103 to perform image compression processing, and generates data of a JPEG file, for example. Then, a recording device 105 records the data of the JPEG file in a recording medium 106.

Moreover, for example, in a case where resizing processing of an image of the YUV data (hereinafter, referred to as a YUV image) is performed, a resize circuit 131 reads out the YUV data accumulated in the buffer memory 103 to perform size conversion processing. The YUV data subjected to the size conversion processing is accumulated in the buffer memory 103.

In a case where the YUV image is displayed, a display control circuit 108 reads out the YUV data accumulated in the buffer memory 103 to convert the YUV data into display data. The display data output from the display control circuit 108 is converted into an analog display signal by a digital-to-analog converting circuit 109, and thereafter transmitted to a monitor device 110.

The monitor device 110 is a liquid crystal display device or the like, and displays, on a screen, a video based on the display signal supplied from the digital-to-analog converting circuit 109. The video displayed by the monitor device 110 includes a so-called live image which is captured at a frame period, for example, before or after photographing a still image or the like. Moreover, in a case where camera photographing setting or the like is performed by a user via the UI device 111 at a time of capturing an image, the system controller 107 generates UI screen data for the camera photographing setting, and transmits the UI screen data to the display control circuit 108. The display control circuit 108 at this time generates display data of a UI screen, and the display data is converted into an analog display signal by the digital-to-analog converting circuit 109 and transmitted to the monitor device 110. Thereby, the UI screen is displayed on the monitor device 110. Note that, it is possible to superimpose and display the above-described YUV image and UI screen. In this case, a compositing circuit 133 performs superimposing processing by which the YUV image read out from the buffer memory 103 is composited with the UI screen, and image data subjected to the superimposing processing is transmitted to the display control circuit 108. Then, the display control circuit 108 generates display data from the image data subjected to the superimposing processing and outputs the display data to the digital-to-analog converting circuit 109, and thereby the photographed image (YUV image) and the UI screen are superimposed and displayed in the monitor device 110.

An image correction circuit 160 performs, for image data (the RGB data or the YUV data) accumulated in the buffer memory 103, image correction processing based on an image correction value set by the system controller 107. Examples of the image correction processing based on the image correction value include, for example, correction of various image distortion such as distortion resulting from a lens, correction processing for a color or luminance each of which is set by a user, and other various types of correction processing. The image data subjected to the image correction processing by the image correction circuit 160 is temporarily stored in the buffer memory 103.

Moreover, the image processing apparatus of the present exemplary embodiment also includes a face detecting circuit 120, an organ detecting circuit 121, a histogram circuit 130, a block integrating circuit 132, and a simple signal processing circuit 141. The simple signal processing circuit 141 reads out the RGB data from the buffer memory 103, performs simple signal processing based on setting of development by the system controller 107, and generates YUV data (YUV image).

The face detecting circuit 120 detects a face region of a person of an object from the YUV image generated by the simple signal processing, and further detects a coordinate position of the detected face region in the image. Then, the face detecting circuit 120 temporarily accumulates coordinate position information of the detected face region in the buffer memory 103 and also outputs the coordinate position information to the organ detecting circuit 121 and the histogram circuit 130. Note that, face detection processing by the face detecting circuit 120 will be describe in detail below.

The organ detecting circuit 121 specifies, on the basis of the coordinate position information of the face region, the face region in the YUV image generated by the simple signal processing, detects, from the face region, organs such as a mouth, an eye, and an eyebrow, which are parts constituting a face, and detects a coordinate position of each of the organs in the image. Coordinate position information of each of the organs detected by the organ detecting circuit 121 is temporarily accumulated in the buffer memory 103. Note that, organ detection processing by the organ detecting circuit 121 will be described in detail below.

The histogram circuit 130 specifies the face region in the image of the RGB data (referred to as the RGB image) of the buffer memory 103 on the basis of the coordinate position information of the face region and the coordinate image information of each of the organs, and acquires a histogram of a region in the face region, which excludes the organs such as the mouth, the eye, and the eyebrow. That is, the histogram circuit 130 acquires a histogram of a pixel value in a region (skin color region) in the face region, which excludes the organs, such as the mouth, the eye, and the eyebrow, colors of which are not a skin color. Here, in a case of the present exemplary embodiment, the histogram circuit 130 acquires a histogram of each of block regions which are obtained by dividing the face region in the RGB image into a plurality of block regions. Therefore, the RGB image accumulated in the buffer memory 103 is read out by the block integrating circuit 132. The block integrating circuit 132 divides the face region in the RGB image into the plurality of block regions, calculates each integral value of RGB (hereinafter, referred to as the block integral value) for each of the block regions, and outputs the block integral values to the histogram circuit 130. Then, among the block integral values, the histogram circuit 130 acquires the histogram of each of the block regions of the skin color, which exclude the organs such as the mouth, the eye, and the eyebrow. Information of the histogram of each of the block regions, which have been acquired by the histogram circuit 130 in this manner, is temporarily accumulated in the buffer memory 103. Note that, the block division and the calculation of the block integral value may be performed for the RGB image (that is, an image of one screen). Histogram acquisition processing by the histogram circuit 130 will be described in detail below.

As described above, in the image processing apparatus of the present exemplary embodiment, the face region, the coordinate position information thereof, the coordinate position information of the organs, and the information of, for example, the histogram of each of the block regions are accumulated in the buffer memory 103. Accordingly, the system controller 107 is able to acquire detailed information of color saturation, hue, luminance, and the like for each of the block regions in the face region on the basis of the face region, the coordinate position information thereof, the coordinate position information of the organs, and the information of the histogram of each of the block regions. Similarly, the system controller 107 is able to detect a high-luminance region in which overexposure occurs in a skin color part excluding a part, such as a mouth, an eye, or an eyebrow, a color of which is not the skin color, in the face region, that is, a shine region and a degree of occurrence of shine in each of the block regions in detail.

Note that, the shine is a phenomenon that light of an environmental light source or strobe light is reflected by a surface of, for example, a skin of a person of an object, an input signal value taken by the image capturing apparatus is saturated and therefore color information vanishes, and an image of a part of the skin is captured as being white (causes blown out highlights). When there part, in which shine is caused and which locally has high luminance, in a skin color region, impression which is not desirable for a portrait image is given. Therefore, for an image including a saturation region (region in which shine occurs) in which an input signal value is saturated, the image capturing apparatus performs shine correction such that the saturation is corrected to thereby reduce shine.

In the case of the present exemplary embodiment, the shine correction processing is performed as one type of signal processing by the signal processing circuit 140. Accordingly, the system controller 107 calculates a shine correction parameter as one of image processing parameters, and sets, for the signal processing circuit 140, image processing parameters including the shine correction parameter.

Figure 2A:
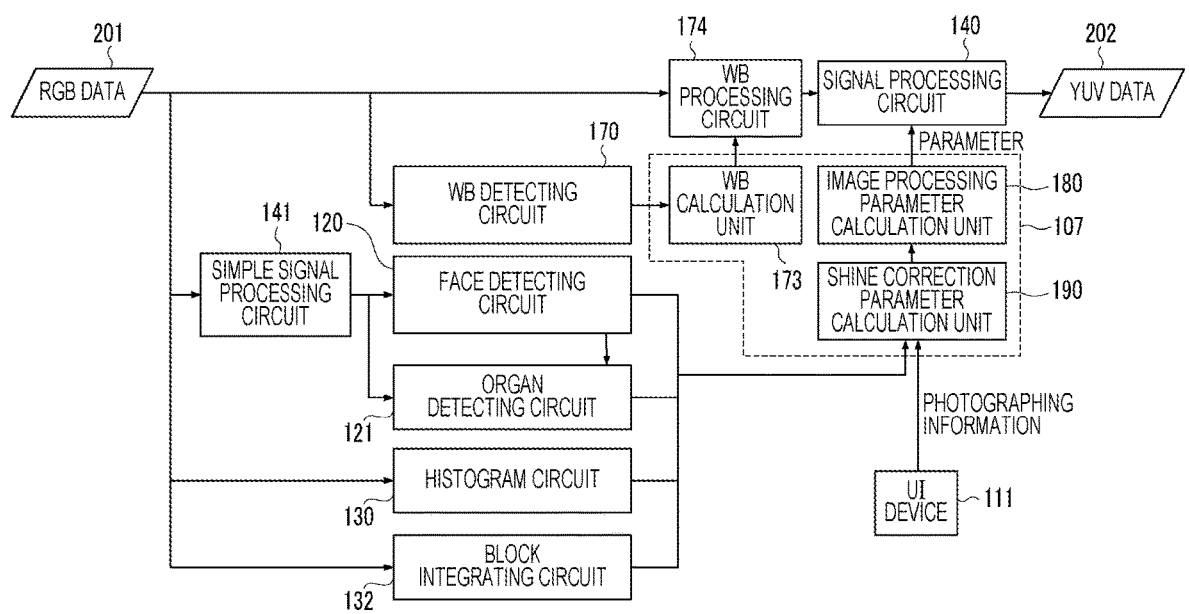
FIGS. 2A and 2B are views illustrating a main part that performs image processing.

FIG. 2A is a block diagram illustrating a flow of processing of each unit and each circuit, in which information of a face region and organs is acquired from a photographed image and signal processing is performed by the signal processing circuit 140 by using image processing parameters including a shine correction parameter that is calculated on the basis of the information.

In FIG. 2A, RGB data 201 (RAW data) read out from the buffer memory 103 is transmitted to the WB detecting circuit 170, the WE processing circuit 174, the simple signal processing circuit 141, the histogram circuit 130, and the block integrating circuit 132.

The WB detecting circuit 170 extracts a white region from the RGB data 201 on the basis of a WE detection setting value which is set by the system controller 107 in the above-described manner. Information of the white region detected by the WE detecting circuit 170 is transmitted to a WE calculation unit 173. Note that, although omitted in FIG. 2A, the information of the white region is transmitted also to an image processing parameter calculation unit 180. It is configured so that each of the WB calculation unit 173, the image processing parameter calculation unit 180, and a shine correction parameter calculation unit 190 described below is formed as a functional block in the system controller 107 of FIG. 1.

The WB calculation unit 173 of the system controller 107 calculates a WE coefficient on the basis of the information of the white region detected by the WB detecting circuit 170, and sets the WB coefficient for the WB processing circuit 174. The WB processing circuit 174 performs WB processing for the RGB data 201 on the basis of the WB coefficient as described above, and transmits the RGB data subjected to the WB processing to the signal processing circuit 140.

The simple signal processing circuit 141 generates YUV data from the RGB data 201 by simple signal processing. The simple signal processing circuit 141 generates the YUV data which is used only for face detection by the face detecting circuit 120 and organ detection by the organ detecting circuit 121, each of which is performed later. Therefore, the simple signal processing circuit 141 does not execute detailed processing, such as noise reduction processing or gamma correction processing, which is performed by the signal processing circuit 140. The YUV data generated by the simple signal processing circuit 141 is transmitted to the face detecting circuit 120 and the organ detecting circuit 121.

The face detecting circuit 120 detects a face region from a YUV image generated by the simple signal processing. The face detecting circuit 120 acquires, as a result of face detection processing, information of each of the detected face region, the number of detected face regions, coordinates of the face region in the image, a degree of reliability of the face detection for each face region, and the like.

Here, as a method of the face detection processing, for example, a method using learning which is represented by a neural network, a method of extracting an organ (part), such as an eye, a nose, a mouth, or an eyebrow, a physical shape of which is characteristic from an image by so-called template matching, or the like is able to be used. Additionally, a method of detecting feature information of an image, such as a skin color or a shape of an eye, and performing analysis by using a statistical technique is able to be used. The method of detecting the feature information and performing analysis by using the statistical technique is disclosed in, for example, Japanese Patent Laid-Open No. 10-232934, Japanese Patent Laid-Open No. 2000-48184, and the like. Additionally, as a method of the face detection processing, any of various face detection methods such as, for example, a method of detecting a face by using wavelet transformation and feature information of an image or a method in which template matching is further combined may be used. The information obtained by the face detection processing performed by the face detecting circuit 120 is transmitted to the shine correction parameter calculation unit 190 of the system controller 107 and also to the organ detecting circuit 121. Note that, the information obtained by the face detection processing is transmitted also to the histogram circuit 130 and the block integrating circuit 132 via the buffer memory 103.

The organ detecting circuit 121 performs organ detection processing by which each of organs in the face region detected by the face detecting circuit 120 is detected from the YUV image generated by the simple signal processing. That is, the organ detecting circuit 121 acquires, by the organ detection processing, detailed information of each of the organs in the face region, such as a mouth, a nose, an eye, and an eyebrow, and information of an angle of the face or the like. As a method of detecting the organs (parts) in the face region, similarly to the above-described face detection method, any of various methods such as a method of using template matching and a method of using the neural network may be used. Note that, a method described in Japanese Patent Laid-Open No. 2005-327009 may be used as well. The information obtained by the organ detection processing performed by the organ detecting circuit 121 is transmitted to the shine correction parameter calculation unit 190 of the system controller 107.

The block integrating circuit 132 divides the RGB image of the RGB data 201 into a plurality of block regions as described above, and calculates block integral values. The block integral values are transmitted to the histogram circuit 130 via the buffer memory 103 as described above. The histogram circuit 130 acquires a detailed histogram of each of block regions of a skin color region in the face region on the basis of the information of the face region and each of the organs and each of the block integral values calculated by the block integrating circuit 132, as described above. Information of the histogram acquired by the histogram circuit 130 is transmitted to the shine correction parameter calculation unit 190 of the system controller 107.

Figure 3:
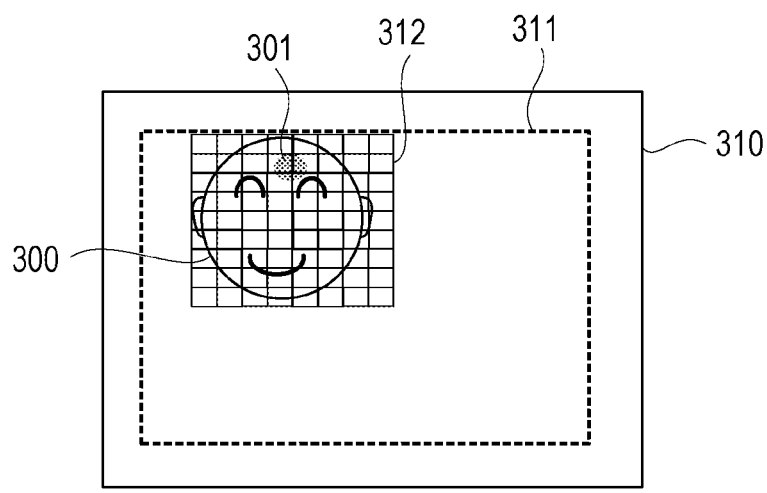
FIG. 3 is an explanatory view of block integration.

FIG. 3 is an image illustrating a face region 300 that is detected from an RGB image 310 of the RGB data 201 and a situation in which the face region 300 is divided into a plurality of block regions 312. FIG. 3 illustrates an example in which a shine region 301 is included in the face region 300. Note that, a size of each of the block regions 312 (size of one block for which an integral value is calculated) may be variable in accordance with a size of the face region 300. Moreover, not only a range including the face region 300 as the example of FIG. 3 but also a range 311 which substantially corresponds to an entirety of the image 310 may be set as a range for which block division is performed.

Figure 4A:
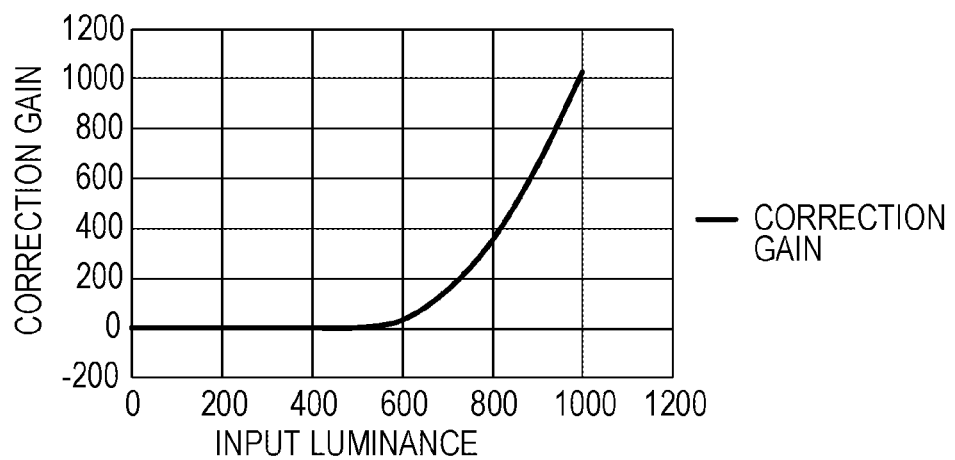
FIGS. 4A and 4B are explanatory views of correction gain.

In addition to the information of the face region and the information of each of the organs which are described above, information (photographing information) which is set by a user via the UI device 111 before photographing the image or at a time of photographing the image is also supplied to the shine correction parameter calculation unit 190. The photographing information is information set by the user and, in the present exemplary embodiment, includes information of, for example, intensity of shine correction, information as to whether or not to perform shine correction processing, and the like. For example, in a case where the intensity of the shine correction is set to be increased, the shine correction parameter calculation unit 190 sets, for example, a shine correction parameter by which correction gain is increased and which is indicated in FIG. 4A described below. Shine correction parameter calculation will be described in detail below. Then, the shine correction parameter is transmitted to the image processing parameter calculation unit 180 of the system controller 107.

The image processing parameter calculation unit 180 determines an image processing parameter for gradation setting, color conversion processing, or the like according to the above-described information of the white region, which has been detected by the WB detecting circuit 170, and includes the above-described shine correction parameter in the image processing parameter to transmit the resultant to the signal processing circuit 140.

The signal processing circuit 140 performs, for the RGB data subjected to the WB processing by the WB processing circuit 174, signal processing according to the image processing parameter, and further generates YUV data 202. The processing by the signal processing circuit 140 will be described in detail below.

Figure 2B:
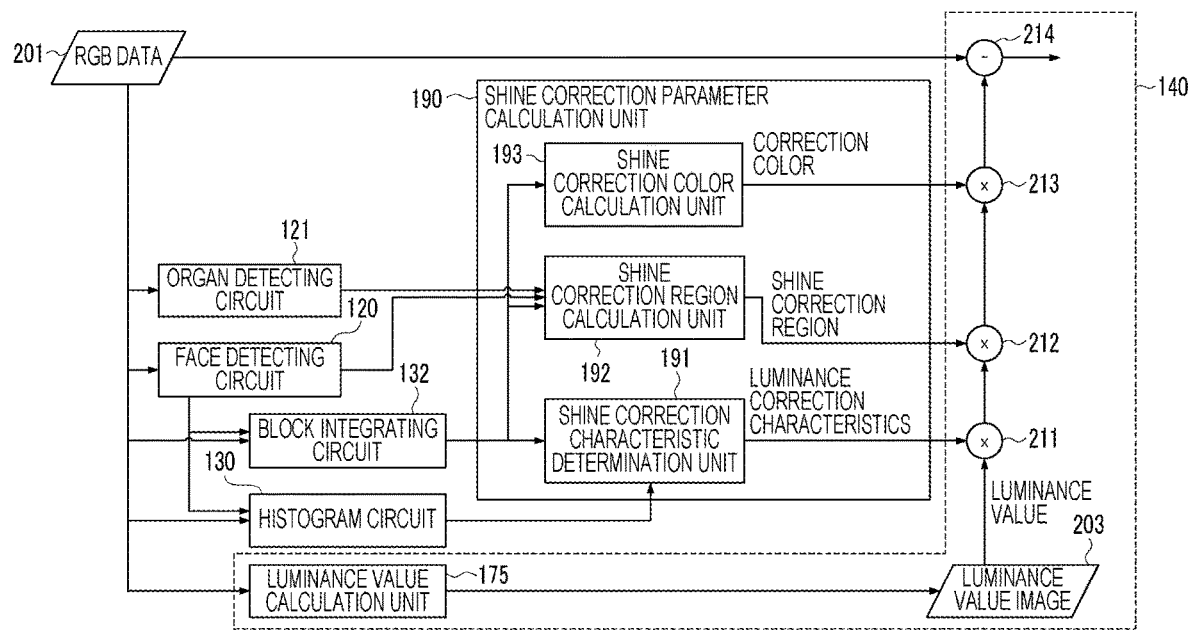

FIG. 2B is a block diagram illustrating a flow of processing by the shine correction parameter calculation unit 190 of FIG. 2A, each circuit related thereto, and the like. FIG. 2B illustrates only constituents related to the shine correction processing, so that illustration of the WB detecting circuit 170, the WB processing circuit 174, the WB calculation unit 173, the simple signal processing circuit 141, and the image processing parameter calculation unit 180 of FIG. 2A is omitted. Moreover, a luminance value calculation unit 175 and calculation units 211 to 214 in FIG. 2B are constituents in the signal processing circuit 140, which are related to the shine correction processing. Note that, since the face detecting circuit 120, the organ detecting circuit 121, the block integrating circuit 132, and the histogram circuit 130 in FIG. 2B are similar to those in FIG. 2A described above, description thereof will be omitted. As illustrated in FIG. 2B, the shine correction parameter calculation unit 190 is configured to include a shine correction characteristic determination unit 191, a shine correction region calculation unit 192, and a shine correction color calculation unit 193.

The shine correction characteristic determination unit 191 determines a correction characteristic parameter that indicates correction characteristics at a time of determining correction gain according to luminance (set as input luminance) of an image. In the case of the present exemplary embodiment, the shine correction characteristic determination unit 191 determines the correction characteristics on the basis of the block integral value calculated by the block integrating circuit 132 and the information of the histogram from the histogram circuit 130.

Figure 4B:
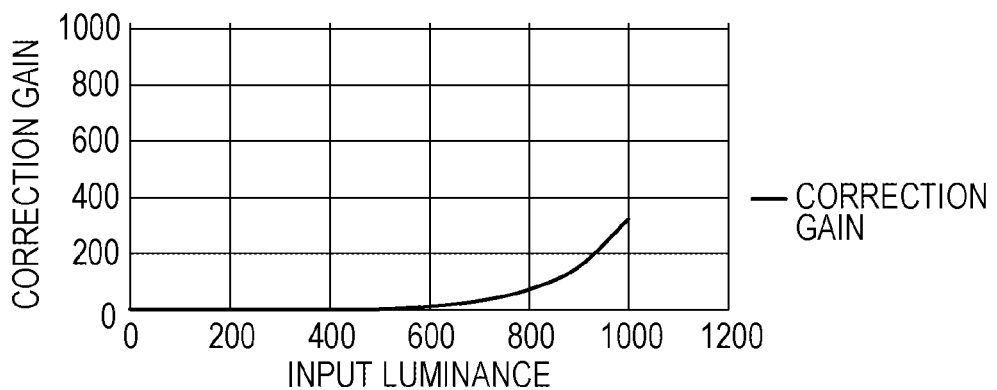

FIG. 4A and FIG. 4B are views illustrating correction characteristics for determining correction gain according to input luminance, in each of which a horizontal axis indicates the input luminance and a vertical axis indicates the correction gain.

Here, in a case where correction characteristics with which, as the input luminance becomes high, the correction gain is greatly increased, for example, as illustrated in FIG. 4A are used, it is possible to effectively perform correction for an overexposure region (shine region) in which luminance is high. On the other hand, in a case where correction characteristics with which an increase in the correction gain is small even when the input luminance becomes high, for example, as illustrated in FIG. 4B are used, it is possible to make a correction amount small. In this manner, when a relation between the input luminance and the correction gain is made to be variable, it is possible to make the correction characteristics variable.

In order to make the correction characteristics variable as illustrated in FIGS. 4A and 4B, the shine correction characteristic determination unit 191 of the present exemplary embodiment is to determine the correction characteristics in accordance with a degree of overexposure in a face region in an image. Specifically, on the basis of block integral values of a face region and coordinates of each of organs, the shine correction characteristic determination unit 191 first calculates an overexposure amount of block regions of a cheek part, a forehead part, and a nose part which are in a skin color region of the face region. For example, the shine correction characteristic determination unit 191 calculates the number of blocks of the cheek part, the forehead part, and the nose part in the skin color region, in each of which an average value of block integral values or a luminance average value of the block regions exceeds a predetermined threshold, and calculates the number of blocks as the overexposure amount. Alternatively, the shine correction characteristic determination unit 191 calculates, from the histogram acquired by the histogram circuit 130, the number of pixels brightness of each of which is equal to or more than predetermined brightness in the face region, and calculates the number of pixels as the overexposure amount. Then, the shine correction characteristic determination unit 191 varies the correction characteristics in accordance with the overexposure amount obtained from the above-described number of blocks or number of pixels, that is, the degree of overexposure. The shine correction characteristic determination unit 191 transmits the correction characteristic parameter that indicates the correction characteristics determined in such a manner to the calculation unit 211 of the signal processing circuit 140 as one of shine correction parameters.

The shine correction region calculation unit 192 calculates, as a shine correction region, a range in the face region, which is targeted for shine correction, that is, a skin color region in the face region, which excludes regions of organs, such as an eye and a mouth, colors of which are not a skin color, and determines a shine correction region parameter that indicates the shine correction region. In the case of the present exemplary embodiment, the shine correction region calculation unit 192 determines the shine correction region parameter on the basis of the face region detected by the face detecting circuit 120, each of the organs detected by the organ detecting circuit 121, and each of the block integral values calculated by the block integrating circuit 132.

Figure 5:
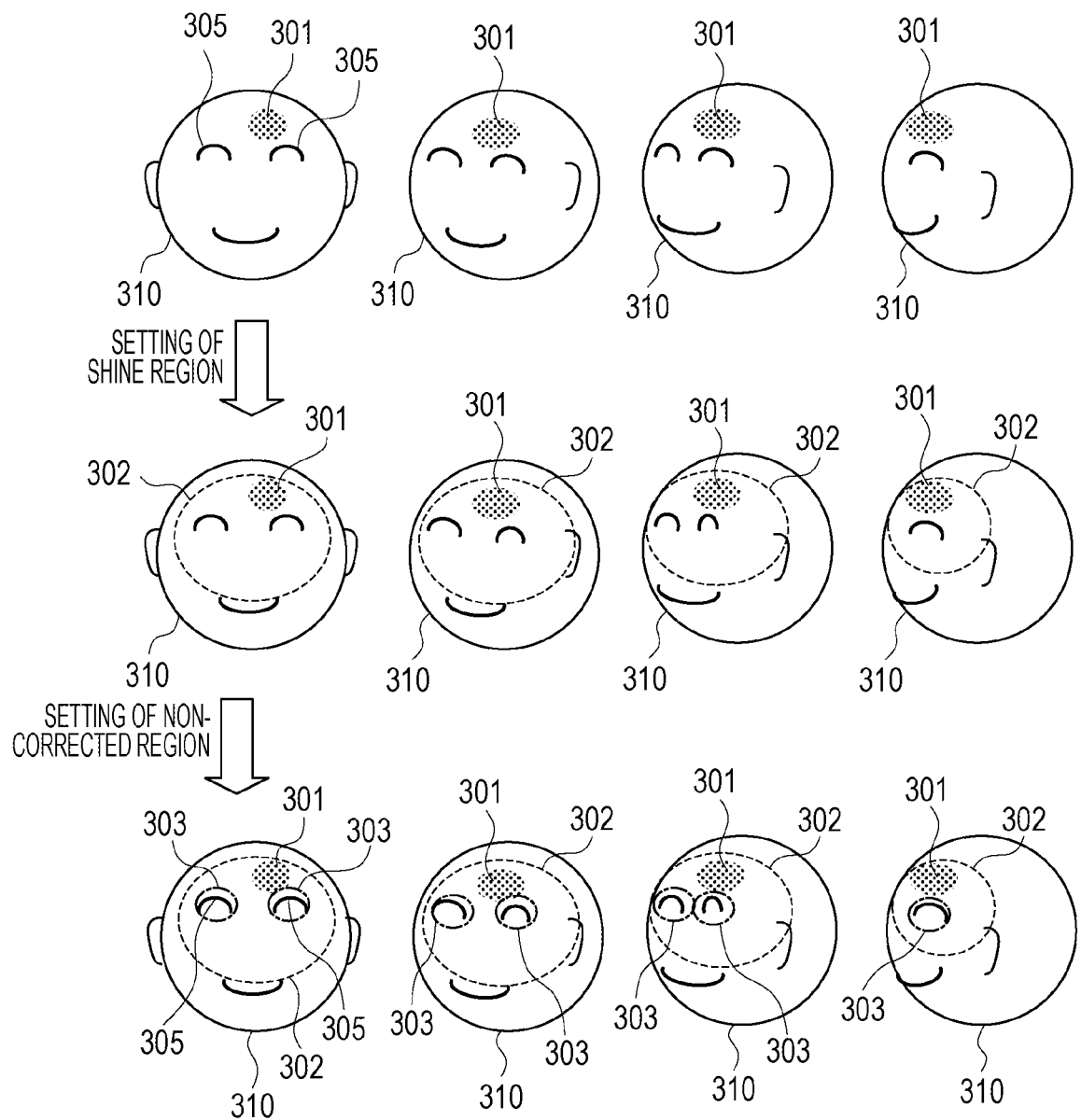
FIG. 5 is an explanatory view of determination of a shine correction region.

FIG. 5 illustrates examples of face regions 310 which face various directions (have various face angles), and the shine correction region calculation unit 192 determines a shine correction region for each of the face regions 310. In an upper row of FIG. 5, each of the face regions 310 which face various directions is illustrated, and it is assumed that each of the face regions 310 includes organs such as an eye 305 and also includes the shine region 301 which is a high-luminance region in which overexposure is caused. In a middle row of FIG. 5, a shine correction region 302 which is determined for each of the face regions 310 in the upper row is illustrated. In a lower row of FIG. 5, a non-corrected region 303 in the shine correction region 302 determined for each of the face regions 310, for which shine correction is not performed, is illustrated. In the case of the examples, the non-corrected region 303 is set as a region of an organ (in the examples, the eye 305) that exists in the shine correction region 302.

In the examples of FIG. 5, at a time of determining the shine correction region 302, on the basis of the information of the face region 310 and each of the organs, the shine correction region calculation unit 192 determines a size of an ellipse from a distance between coordinates of, for example, both eyes (305), and determines a center position of the ellipse from positions of the both eyes. In the present exemplary embodiment, the ellipse is used for the determination of the shine correction region 302. Moreover, the shine correction region calculation unit 192 calculates a face angle from, for example, a positional relation of the organs, and judges, on the basis of the angle, whether or not a face is deviated from the front. In a case where the face is deviated from the front, the shine correction region calculation unit 192 calculates a direction and an angle of the deviation, and deviates the center of the ellipse by an amount corresponding to the angle of the deviation in a direction opposite to the direction of the deviation. At this time, the shine correction region calculation unit 192 modifies the size of the ellipse (that is, a size of the shine correction region 302) in accordance with the angle of the deviation. It is thereby possible to eliminate a bad influence due to protrusion of the shine correction region 302 from the face region 310.

Furthermore, the shine correction region calculation unit 192 specifies an organ region of, for example, the eye 305, which has high luminance but is not an overexposure region, on the basis of the information of each of the organs and the block integral values, and sets the region as the non-corrected region 303 which is excluded from the shine correction region 302. Moreover, the shine correction region calculation unit 192 gradually reduces correction intensity for the shine correction region 302 from the center of the ellipse toward a periphery to thereby reduce occurrence of a sudden change due to a change between the shine correction region 302 and an outside of the correction region in the periphery thereof. Similarly, the shine correction region calculation unit 192 performs setting also for the non-corrected region 303 of the organ of the eye 305 so as not to correct a center part of the non-corrected region 303 (center part of the eye 305), and performs setting so as to increase the correction intensity as becoming closer to a periphery of the non-corrected region 303. Thereby, the shine correction region calculation unit 192 reduces occurrence of a sudden change due to a change between the shine correction region 302 and the non-corrected region 303. Then, the shine correction region calculation unit 192 transmits the shine correction region parameter that indicates the shine correction region 302, which is set in such a manner, to the calculation unit 212 of the signal processing circuit 140 as one of the shine correction parameters.

The shine correction color calculation unit 193 calculates a shine correction color for the shine correction on the basis of a correction target color, and determines a shine correction color parameter that indicates the correction color. Here, in the present exemplary embodiment, the shine correction is performed by multiplying the correction color by correction gain and subtracting the resultant from the RGB data 201. Moreover, in the case of the present exemplary embodiment, the correction target color is a skin color of the face region, and, for example, when a saturation value is taken into consideration, the skin color is required to be realized after subtracting a value of the correction color from the saturation value, so that a difference value between the saturation value and a value of the skin color is the value of the correction color.

For example, when each of values of R, G, and B is represented by eight bits, a target value of the skin color is represented as (R, G, B)=(230, 200, 170), while the saturation value represented as (R, G, B)=(255, 255, 255).

Accordingly, when the target value of the skin color is subtracted from the saturation value, the value of the correction color is represented as (R, G, B)=(25, 55, 85).

However, since the target value of the skin color varies in accordance with brightness of an object, the correction color is required to be variable in accordance with the brightness of the object. Moreover, a ratio of RGB of the target value of the skin color varies also according to, for example, a human race, an age, sex, or a difference between individuals. Therefore, the shine correction color calculation unit 193 calculates tint from block regions of, for example, both cheeks (that is, a part considered to have a skin color) in the face region, in each of which none of values of RGB is saturated, and sets the tint as the target color of the skin color. Then, the shine correction color calculation unit 193 calculates the correction color according to the target color of the skin color which has been set in such a manner, and transmits the shine correction color parameter that indicates the correction color to the calculation unit 213 of the signal processing circuit 140 as one of the shine correction parameters.

As illustrated in FIG. 2B, the signal processing circuit 140 includes the luminance value calculation unit 175 and the calculation units 211 to 214 as constituents related to the shine correction processing. The luminance value calculation unit 175 generates a luminance value image 203 constituted by luminance values of pixels of the RGB image, and transmits the luminance value image 203 to the calculation unit 211. The calculation unit 211 calculates, on the basis of the correction characteristics indicated by the above-described correction characteristic parameter, correction gain according to the luminance value for each of pixels of the luminance value image 203, and transmits the correction gain of each of the pixels to the calculation unit 212. The calculation unit 212 extracts, from the correction gain calculated on the basis of the luminance value image 203, each correction gain corresponding to the shine correction region indicated by the above-described shine correction region parameter, and transmits the correction gain of the shine correction region to the calculation unit 213. The calculation unit 213 multiplies the correction color indicated by the above-described correction color parameter by the correction gain of the shine correction region, and transmits, to the calculation unit 214, information of each of correction colors subjected to the multiplication by the correction gain. The calculation unit 214 subtracts each of the above-described correction colors subjected to the multiplication by the correction gain from the RGB data 201 serving as the RGB image. Thereby, an RGB image subjected to the shine correction for the shine region in the shine correction region is generated by the calculation unit 214. Thereafter, the signal processing circuit 140 generates the YUV data 202 from the RGB data subjected to the shine correction.

What has been described above is the basic flow of the calculation processing of the shine correction parameters and the shine correction processing of the present exemplary embodiment.

Hereinafter, description will be given for shine correction processing performed by the image processing apparatus of the present exemplary embodiment in a case where there are a plurality of face regions which are image regions of objects, some faces of the face regions partially overlap with each other, for example, and shine is caused in the overlapping region.

Figure 6:
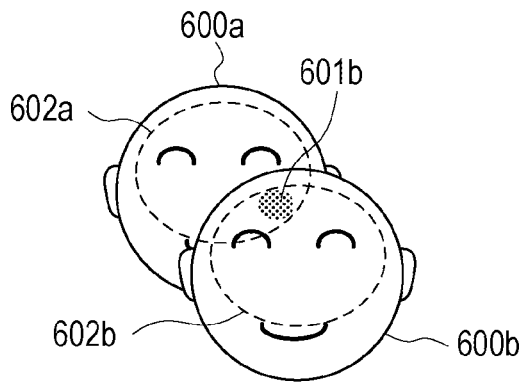
FIG. 6 is a view illustrating an example of a case where faces overlap with each other.

FIG. 6 is a view illustrating an example in which two faces which are objects partially overlap with each other and there is an overlapping region in two face regions 600a and 600b. In the example of FIG. 6, it is assumed that the face region 600b is on a closer side (side closer to the image capturing apparatus) than the face region 600a is, and a shine region 601b is included in the face region 600b. In addition, it is assumed that regions in the face regions 600a and 600b, each of which is surrounded by a dotted line, are shine correction regions 602a and 602b which are respectively obtained in the face regions 600a and 600b. Then, in the shine region 601b of the face region 600b, the shine correction region 602a of the face region 600a and the shine correction region 602b of the face region 600b are assumed to overlap with each other. As in the example of FIG. 6, in a case where the shine region 601b is included in the region in which the face regions 600a and 600b overlap, it is necessary to consider on the basis of a skin color of which face region a target value of a skin color is to be calculated. For example, when correction of the shine region 601b of the face region 600b is performed by calculating the target value of the skin color erroneously on the basis of the skin color of the face region 600a, there is a possibility that an unnatural face image in which the region in the face region 600b, for which the shine correction has been performed, is in the skin color having a different tint.

Figure 7:
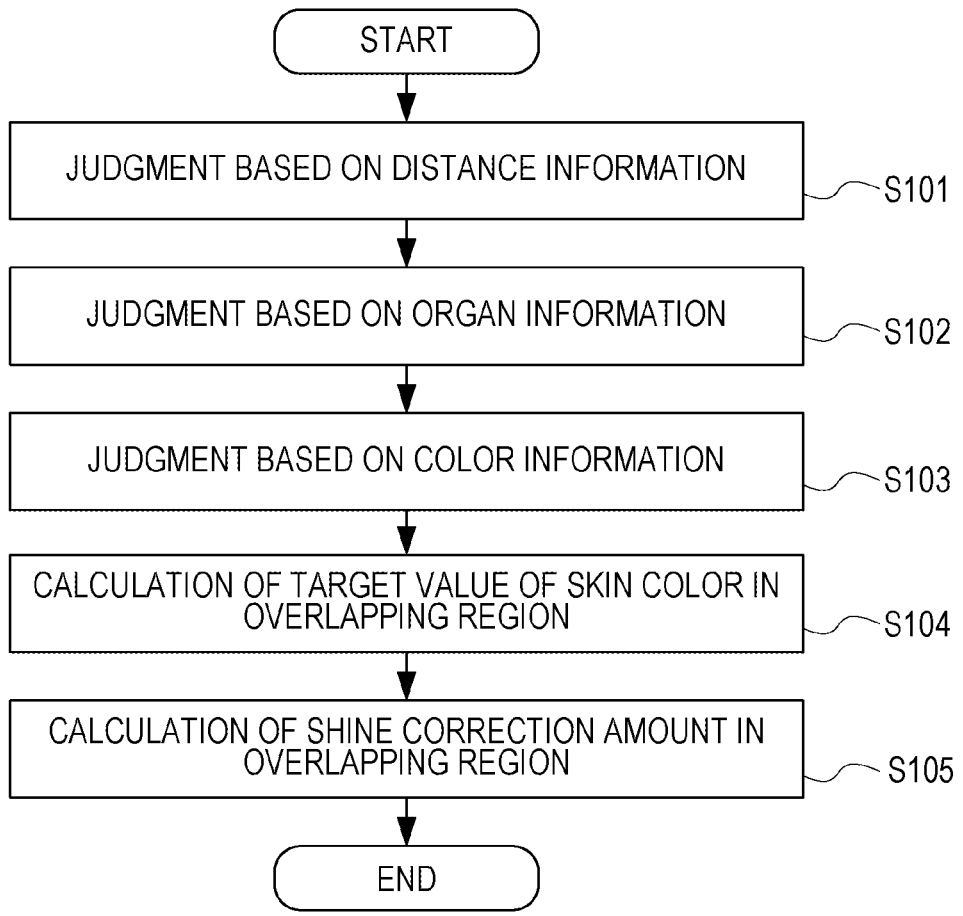
FIG. 7 is a flowchart of shine correction amount calculation processing.

Therefore, in the image processing apparatus of the present exemplary embodiment, in a case where the shine correction regions 602a and 602b of the face regions 600a and 600b overlap and shine is caused in the overlapping region, to which face region of the face regions 600a and 600b the overlapping region belongs is judged. FIG. 7 illustrates a flowchart of processing of judging to which face region a region in which shine correction regions overlap belongs. In the case of the present exemplary embodiment, the processing of the flowchart of FIG. 7 is assumed to be performed by the system controller 107, for example. Note that, in the flowchart of FIG. 7, steps S101 to steps S105 are respectively abbreviated as S101 to S105. Moreover, the processing of the flowchart of FIG. 7 may be carried out by a hardware configuration or a software configuration, or a part thereof may be realized by the software configuration and the other part may be realized by the hardware configuration. In a case where the processing is carried out by the software configuration, the processing of the flowchart of FIG. 7 is able to be realized, for example, when a program stored in a ROM (not illustrated) or the like is developed in a RAM or the like and executed by the system controller 107. The program according to the present exemplary embodiment may be not only prepared in the ROM or the like in advance but also loaded in the RAM or the like, for example, by being read out from a detachably attachable semiconductor memory or being downloaded from a network (not illustrated) such as the Internet.

At S101 of FIG. 7, the system controller 107 judges, on the basis of distance information acquired at a time of photographing an image, to which face region of the face regions 600a and 600b the region in which the shine correction regions overlap belongs. As a method of acquiring distance information at the time of photographing an image, a publicly known method is able to be used. For example, as a method of acquiring distance information for each pixel of the image, a method using an image capturing sensor that has a structure in which two light receiving elements (an A element and a B element) are provided in each pixel and a microlens is provided for each pixel composed of a pair of the A element and the B element is known. In a case of the example, an optical image via the lens barrel device 102 is divided and received by the A element and the B element via the microlens, and thereby acquired as two image signals of an A image and a B image that have parallax. With such information of parallax of each pixel, it is possible to calculate a distance from the image capturing sensor to an object.

Figure 8A:
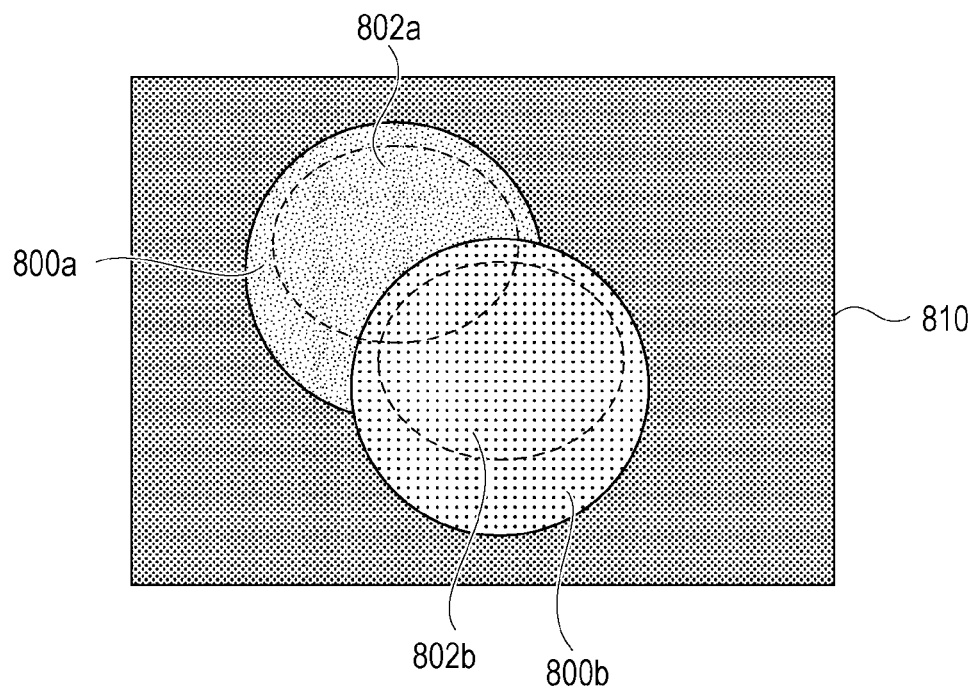
FIGS. 8A and 8B are explanatory views of distance information and a degree of reliability according to the distance information.

FIG. 8A illustrates an example of a distance image 810 constituted only by the distance information which is obtained by calculating the distance information for each pixel in the above-described image example of the face regions 600a and 600b of FIG. 6. The system controller 107 calculates an average distance of each of the face regions 600a and 600b of FIG. 6. It is assumed that a distance region 800a of FIG. 8A indicates average distance information of the face region 600a of FIG. 6 and a distance region 800b indicates average distance information of the face region 600b. In the distance image 810 exemplified in FIG. 8A, a distance is represented with a shade (height of density of dots) of black and white, and the distance is represented with a color closer to black (density of dots becomes higher) as being longer and represented with a color closer to white (density of dots becomes lower) as being shorter. That is, in the example of FIG. 6, the face region 600b is on the closer side than the face region 600a is and the distance thereof is shorter, so that the distance region 800b has a color closer to white (density of dots which is set to be lower) than that of the distance region 800a illustrated in FIG. 8A. The shine correction regions 602a and 602b of FIG. 6 are respectively represented by regions 802a and 802b each of which is surrounded by a dotted line in the illustration of FIG. 8A. Then, it is considered that there is a high possibility that the overlapping region of the shine correction regions 602a and 602b of FIG. 6 belongs to the face region 600b on the closer side, that is, to the distance region 800b the distance of which is short in the distance image 810 of FIG. 8A.

Figure 8B:
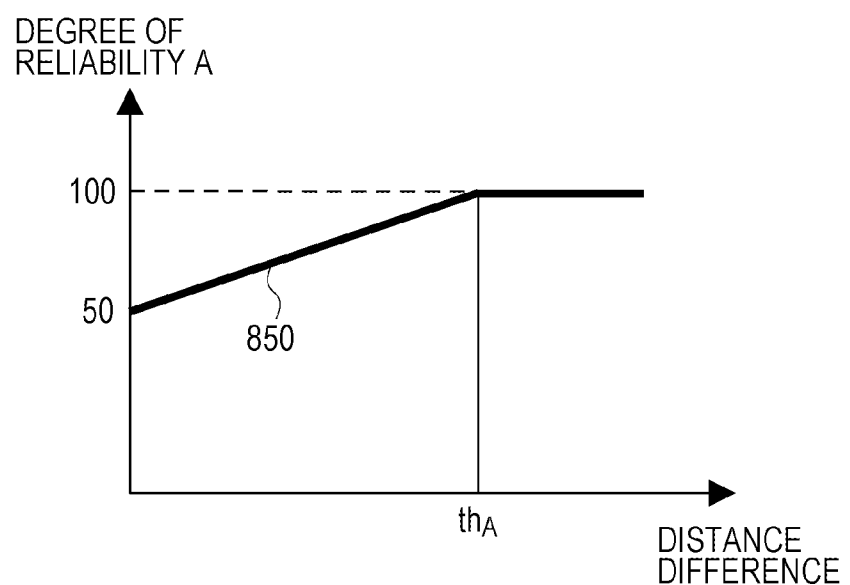

In the present exemplary embodiment, at a time of judging to which face region the overlapping region of the shine correction regions belong, not only the distance information but also a degree of reliability A based on a table 850 indicated in FIG. 8B is used. In the case of the present exemplary embodiment, the degree of reliability A is set on the basis of the table 850 that is indicated in FIG. 8B, for example, and indicates a relation of the degree of reliability A and a distance difference. The degree of reliability A of the table 850 indicated in FIG. 8B indicates height of a possibility (degree of certainty) that the overlapping region of the shine correction regions belongs to the face region the distance of which is shorter. According to the table 850 exemplified in FIG. 8B, in a case where the distance difference between the face regions is equal to or longer than a predetermined distance difference threshold (equal to or longer than a threshold $th_A$), the degree of reliability A is set to be a value (for example, a value of "100") by which it is judged that the overlapping region belongs to the face region on the closer side (side a distance of which is shorter). Moreover, in a case where the distance difference between the face regions is shorter than the predetermined distance difference threshold (shorter than the threshold $th_A$), the degree of reliability A is set to be a lower value as the distance difference becomes smaller, and set to be a value of, for example, "50" when the distance difference is zero (0). Note that, in a case of the table 850 of FIG. 8B, a degree of reliability of the face region on a farther side (side a distance of which is longer) is able to be represented as (100-A). Therefore, in a case where the distance difference is zero, values of the degrees of reliability A of the face images both become "50". The degree of reliability A is used in the present exemplary embodiment, since, in a case where the distance difference between the face regions is small, there is a possibility that the distance information is erroneous and, only with the distance information, it is therefore difficult to make an assertion as to whether or not the overlapping region is on the closer side. Note that, the table 850 indicated in FIG. 8B is held in advance, for example, in a memory provided in the system controller 107. In this manner, the system controller 107 calculates the distance difference between the face regions from the distance information of the distance regions 800a and 800b illustrated in FIG. 8A, and obtains, on the basis of the distance difference and the table 850 of FIG. 8B, the degree of reliability A which is used for judging to which face region the overlapping region belongs.

Description is returned to the flowchart of FIG. 7.

After S101, the system controller 107 advances the processing to S102. At S102, on the basis of information of each of organs detected from face regions by the organ detecting circuit 121, the system controller 107 judges to which face region the overlapping region of the shine correction regions belongs.

Figures 9A, 9B:
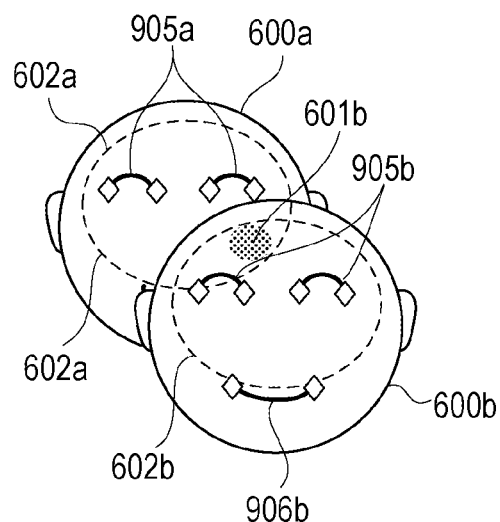
FIGS. 9A and 9B are explanatory views of organ information and a degree of reliability according to the organ information.

FIG. 9A is a view illustrating an example of each of organs detected by the organ detecting circuit 121 from the face regions 600a and 600b illustrated in FIG. 6. As described above, the organ detecting circuit 121 detects information indicating a coordinate position of each of the organs. Accordingly, in a case of the example of FIG. 9A, from the face region 600b on the closer side, information of coordinate positions of, for example, a right end and a left end of each of both eyes 905b and information of coordinate positions of, for example, a right end and a left end of a mouth 906b are detected. On the other hand, in a case of the face region 600a on the farther side, information of coordinate positions of a right end and a left end of each of both eyes 905a is detected, but a mouth is hidden by the face region 600b on the closer side, so that information of a coordinate position thereof is not detected. Therefore, in a case where a plurality of face regions are detected, when any organ of organs that are to naturally exist in a face region is not able to be detected, it is possible to determine that there is a high possibility that the face region in which the organ is not able to be detected is positioned on the farther side. In the case of the example of FIG. 9A, the coordinate position of the mouth which is to be naturally detected is not detected in the face region 600a, while the coordinate positions of the both eyes 905b and the mouth 906b that are to be naturally detected are detected in the face region 600b. Thus, it is possible to determine that the face region 600b is on the closer side and the overlapping region of the shine correction regions belongs to the face region 600b.

Moreover, in a case where the face region to which the overlapping region of the shine correction regions belongs is determined by using information of organs as exemplified in FIG. 9A, a degree of reliability B is set, for example, by using a table indicated in FIG. 9B. The table indicated in FIG. 9B is a table for setting the degree of reliability B according to whether or not each of organs that are to naturally exist in a face region is detected, and is held in advance, for example, in the memory provided in the system controller 107. In a case where all of the organs that are to naturally exist in a face region are detected, the degree of reliability B of the table of FIG. 9B is set to be a value (for example, a value of "100") indicating that there is a high possibility that the overlapping region of the shine correction regions belongs to the face region. On the other hand, in a case where, among all of the organs that are to naturally exist in a face region, there is any organ which is not able to be detected, the degree of reliability B is set to be a value (for example, a value of "70") indicating that there is a low possibility that the overlapping region of the shine correction regions belongs to the face region. In this manner, on the basis of information of each of the organs, which is to be naturally acquired from the face regions 600a and 600b of FIG. 9A and the table of FIG. 9B, the system controller 107 obtains the degree of reliability B that is used for judging to which face region the overlapping region belongs.

Description is returned to the flowchart of FIG. 7.

After S102, the system controller 107 advances the processing to S103. At S103, the system controller 107 judges, on the basis of color information of the face regions, to which face region the overlapping region of the shine correction regions belongs.

Figure 10A:
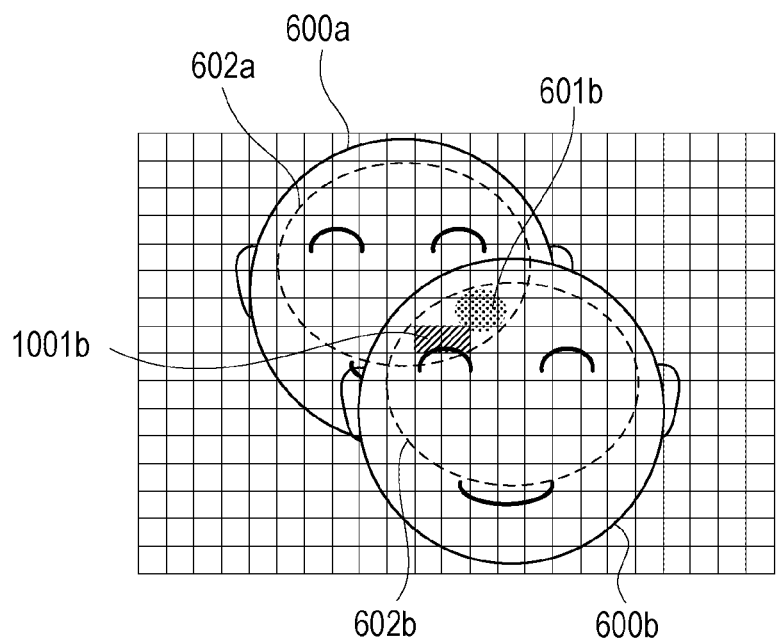
FIGS. 10A and 10B are explanatory views of color information and a degree of reliability according to the color information.

FIG. 10A is a view illustrating the face regions 600a and 600b of FIG. 6, which are subjected to block division by the block integrating circuit 132, and the shine region 601b is included in the overlapping region of the face regions 600a and 600b as described above. The system controller 107 calculates an average value of color information of a region 1001b of blocks, in each of which a signal value (integral value) thereof is not saturated, in the overlapping region of the shine correction regions 602a and 602b of the face regions 600a and 600b. Note that, for the integral value of each of the blocks, what is used at a time of calculating the above-described shine correction parameter may be used. Moreover, depending on a size of the block, there are some cases where even one block is not included in the overlapping region of the shine correction regions, and, in such a case, an integral value of a block which is obtained by finer division may be used. Here, in a case of comparing the average value of the color information of the region 1001b of the blocks, in each of which saturation is not caused, in the overlapping region of the shine correction regions and color information of, for example, both cheek parts in the face regions, the overlapping region of the shine correction regions is considered to belong to the face region a difference in the color information of which is smaller.

As a method of calculating the difference in the color information, various methods are able to be used, and, in the present exemplary embodiment, the calculation is performed simply by using, for example, a formula (1). Note that, in the formula (1), $(R_1, G_1, B_1)$ indicates an RGB value obtained from blocks of both cheek parts, and $(R_2, G_2, B_2)$ indicates an RGB value obtained from the region 1001b of blocks in the overlapping region, in each of which saturation is not caused.

$$\sqrt{[(R_1-G_1)-(R_2-G_2)]^2+[(B_1-G_1)-(B_2-G_2)]^2} \qquad (1)$$

Figure 10B:
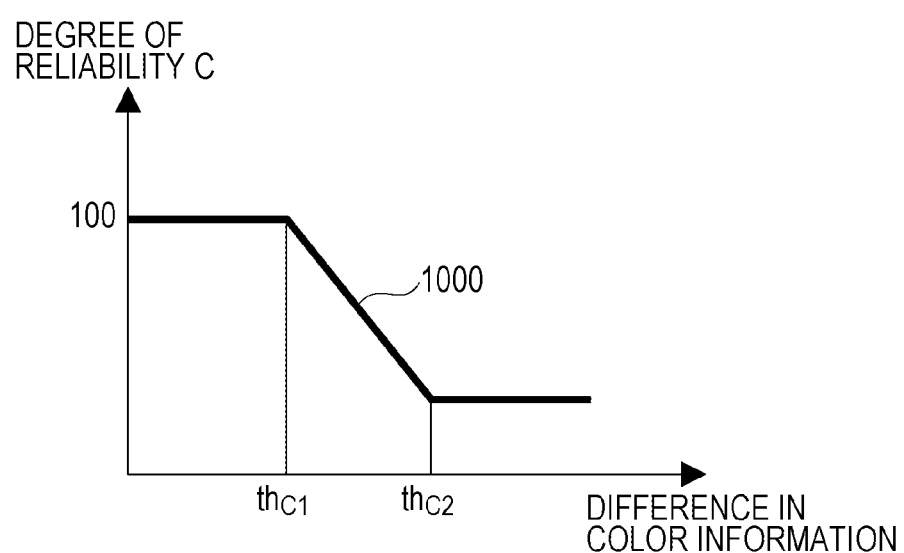

Also in the case of the example, at a time of determining to which face region the overlapping region of the shine correction regions belongs, a degree of reliability C based on a table 1000 indicated in FIG. 10B is used as well. The table 1000 indicated in FIG. 10B indicates a relation of a difference in color information between a region (1001b) in the overlapping region, in which saturation is not caused, and a cheek part and the degree of reliability C. The degree of reliability C of FIG. 10B indicates height of possibility (degree of certainty) that the overlapping region of the shine correction regions belongs to a face region the difference in the color information of which is small. According to the table 1000 indicated in FIG. 10B, in a case where the difference in the color information is equal to or smaller than a predetermined first color difference threshold (equal to or smaller than a threshold $th_{C1}$), the degree of reliability C is set to be a value (for example, a value of "100") with which the overlapping region of the shine correction regions is judged to belong to a corresponding face region. Moreover, in a case where the difference in the color information is larger than the first color difference threshold (larger than the threshold $th_{C1}$) and smaller than a second color difference threshold (larger than the threshold $th_{C1}$ and smaller than a threshold $th_{C2}$, $th_{C1}$<the difference in the color information<$th_{C2}$), the degree of reliability C is set to be a lower value as the difference becomes larger. In a case where the difference in the color information is equal to or larger than the second color difference threshold (equal to or larger than the threshold $th_{C2}$), the degree of reliability C is set to be a value of a minimum degree of reliability, which is defined in advance. Note that, similarly to the above, the table 1000 indicated in FIG. 10B is also held in advance, for example, in the memory provided in the system controller 107. In this manner, on the basis of the difference in the color information between the region in the overlapping region, in which saturation is not caused, and the cheek part, and the table 1000 of FIG. 10B, the system controller 107 obtains the degree of reliability C that is used for judging to which face region the overlapping region of the shine correction regions belongs.

Description is returned to the flowchart of FIG. 7.

After S103, the system controller 107 advances the processing to S104. At S104, the system controller 107 calculates a target value of a skin color of the overlapping region of the shine correction regions. In the case of the present exemplary embodiment, the system controller 107 calculates the target value of the skin color by using the degrees of reliability A, B and C which are calculated at S101 to S103. As an example, the system controller 107 calculates, for each of the face regions, a value (set as a T value) obtained by integrating the above-described degree of reliability A, degree of reliability B, and degree of reliability C that are calculated for each of the face regions. In this case, the system controller 107 calculates T value=(degree of reliability A)×(degree of reliability B)×(degree of reliability C).

Then, the system controller 107 uses, as the target value, a skin color of a face region that has a higher T value, for example. In a case where the face regions 600a and 600b overlap, for example, as in FIG. 6 and a T value calculated in the face region 600a is set as T1 and a T value calculated in the face region 600b is set as T2, the system controller 107 sets, of T1 and T2, the skin color of the face region the T value of which is higher as the target value.

Moreover, in a case where the skin color of the face region 600a is (R1, G1, B1) and the skin color of the face region 600b is (R2, G2, B2), the system controller 107 may obtain a weight average (Ra, Ga, Ba) of the skin colors of the face regions 600a and 600b by formulas (2) to (4) below, and may set the weight average as the target value of the skin color.

$$Ra=(R1\times T1+R2\times T2)/(T1+T2) \qquad (2)$$

$$Ga=(G1\times T1+G2\times T2)/(T1+T2) \qquad (3)$$

$$Ba=(B1\times T1+B2\times T2)/(T1+T2) \qquad (4)$$

However, the formulas (2) to (4) are calculation expressions by which tint of the middle of the skin colors of the face regions is calculated on the basis of a ratio of T1 and T2 of the degrees of reliability, and the tint of the middle is set as the target value of the skin color. Therefore, the skin color of the target value is not greatly different from the skin color of the face region, but it is considered that the skin color of the target value is not accurately coincident with any of the skin colors of the face regions. In this case, for example, when a shine correction amount is increased, there is a possibility that a bad influence of different tint becomes noticeable. Accordingly, in this case, it is necessary to perform adjustment of a correction amount, which is calculated as follows, at the same time.

After S104, the system controller 107 advances the processing to S105. At S105, the system controller 107 calculates a shine correction amount for the shine region in the overlapping region of the shine correction regions. As described above, the shine correction amount is calculated as the shine correction parameter. Here, in a case where the tint of the middle of the skin colors of the face regions is set as the target value of the skin color on the basis of the ratio of T1 and T2 of the degrees of reliability as described above, the system controller 107 adjusts the shine correction amount as follows.

For example, in a case where a maximum T value of the T values (T1 and T2) of the face regions, which are calculated at S104, is equal to or less than a predetermined threshold, the system controller 107 adjusts the shine correction amount to be small, that is, adjusts the shine correction amount so that a degree of the shine correction becomes lower. Alternatively, in a case where a difference of the T values (T1 and T2) of the face regions is equal to or smaller than a predetermined threshold, the system controller 107 adjusts the shine correction amount to be small (so that the degree of the shine correction becomes lower). Since there is a possibility that to which face region the overlapping region belongs is erroneously judged, in order to reduce a bad influence of color deviation caused when the judgment is erroneous, the shine correction amount adjusted to be small in this manner in the case where the T value is low or the case where the difference of the T values is small.

Figure 11A:
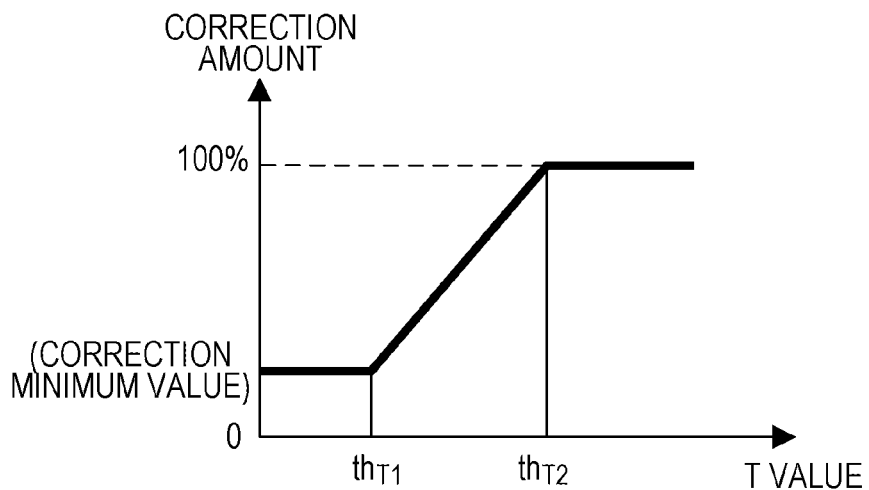
FIGS. 11A and 11B are explanatory views of a correction amount according to a T value, an overlapping area, or a difference of colors.

In the case of the present exemplary embodiment, the system controller 107 adjusts the shine correction amount using, for example, a table 1100 indicated in FIG. 11A. The table 1100 indicated in FIG. 11A indicates a relation of, for example, the maximum T value of the T values of the face regions and an adjustment rate of the correction amount. According to the table 1100 indicated in FIG. 11A, in a case where the T value is equal to or less than a predetermined first reliability threshold (equal to or less than a threshold $th_{T1}$), the correction amount is adjusted to be a minimum value. In a case where the T value is more than the first reliability threshold (more than the threshold $th_{T1}$) and less than a second reliability threshold (less than a threshold $th_{T2}$, $th_{T1}$<the T value<$th_{T2}$), the correction amount is adjusted to be a smaller value as the T value becomes smaller. On the other hand, in a case where the T value is equal to or more than the second reliability threshold (equal to or more than the threshold $th_{T2}$), the above-described calculated correction amount ("100%") is used. In this manner, the system controller 107 adjusts the shine correction amount in accordance with the T value by using the table 1100 of FIG. 11A and thereby adjusts the degree of the shine correction. Note that, similarly to the above, the table 1100 indicated in FIG. 11A is also held in advance, for example, in the memory provided in the system controller 107.

Note that, although not illustrated, also in a case of using the difference of the T values (T1 and T2) of the face regions, the correction amount may be adjusted on the basis of a table (in this case, a table indicating a relation of the difference of the T values and the adjustment rate of the correction amount) which is similar to that of FIG. 11A. For example, in a case where the difference of the T values is equal to or smaller than a predetermined first reliability difference threshold, the correction amount is adjusted to be a minimum value, and in a case where the difference of the T values is larger than the first reliability difference threshold and smaller than a second reliability difference threshold, the correction amount is adjusted to be a smaller value as the difference of the T values becomes smaller. In a case where the difference of the T values is equal to or larger than the second reliability difference threshold, the calculated correction amount is used.

Moreover, for example, in a case where an area of the overlapping region of the shine correction regions is small, it is considered that, even when correction based on erroneous color information of a face region is performed, a bad influence thereof is relatively small. Similarly, also in a case where a difference of colors between overlapping face regions is small, it is considered that, even when correction based on erroneous color information of a face region is performed, a bad influence thereof is relatively small. Therefore, in the present exemplary embodiment, the degree of the shine correction may be determined on the basis of at least one of the area of the overlapping region of the shine correction regions and the difference of the colors between the overlapping face regions.

Figure 11B:
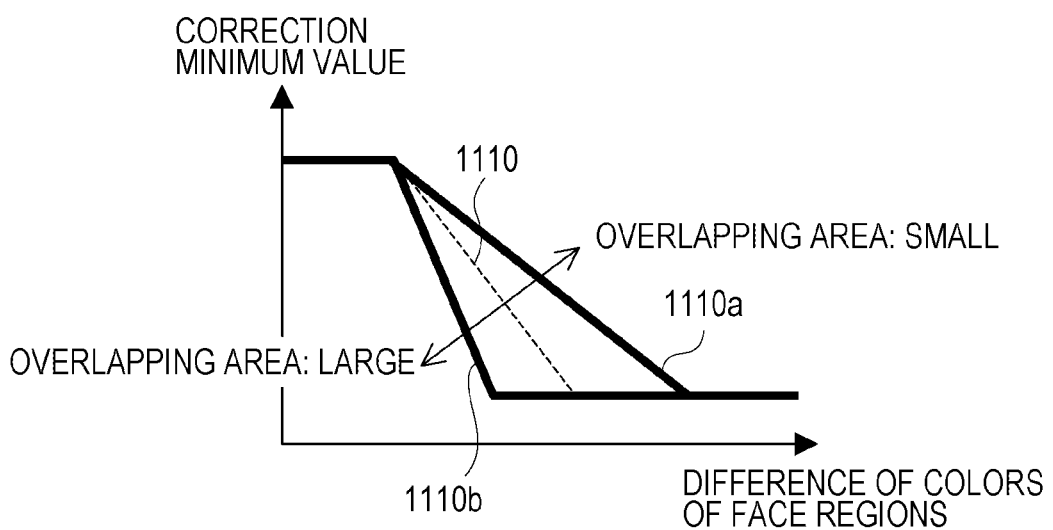

FIG. 11E indicates a table 1110 that indicates a relation of the area of the overlapping region or the difference of the colors between the face regions and the correction minimum value of FIG. 11A. The table 1110 is variable from a table 1110a to table 1110b in accordance with the area of the overlapping region of the shine correction regions as indicated in FIG. 11B. For example, as the area of the overlapping region of the shine correction regions becomes smaller, the table 1110 is able to be varied to the table 1110a having characteristics that the correction minimum value of FIG. 11A is adjusted to be a great value. Moreover, as illustrated in FIG. 11B, the table 1110 is variable from the table 1110a to the table 1110b in accordance with the difference of the colors between the overlapping face regions. For example, as the difference of the colors between the overlapping face regions becomes larger, the table 1110 is able to be varied to the table 1110a having characteristics that the correction minimum value of FIG. 11A is adjusted to be a great value. In this manner, on the basis of at least one of the area of the overlapping region of the shine correction regions and the difference of the colors between the overlapping face regions, the system controller 107 adjusts the correction minimum value of FIG. 11A and then calculates the shine correction amount.

Moreover, in order to eliminate the bad influence as much as possible, shine correction may not be performed for the overlapping region of the shine correction regions. In this case, all in the table 1100 of FIG. 11A may be 0%, and, since calculation results of S101 to S104 are not to be used substantially, the processing thereof may be skipped.

Note that, description has been given in the present exemplary embodiment for a case where three of the distance information, the organ information, and the color information are used, but among them, only one piece or two pieces of information may be used to thereby perform judgement similar to the above.

Even when shine is caused in a region in which a plurality of faces overlap, the image processing apparatus of the first exemplary embodiment is able to judge to which face region the overlapping region of shine correction regions belongs, and thereby perform shine correction with proper tint, so that it is possible to suppress occurrence of a bad influence due to correction by erroneous tint.

Second Exemplary Embodiment

Next, an image processing apparatus of a second exemplary embodiment will be described.

In the second exemplary embodiment, description will be given for processing at a time when shine correction regions overlap in a case where, for example, strobe light emission is performed by the stroboscope device 112 to photograph a still image by the image capturing apparatus to which the image processing apparatus illustrated in FIG. 1 is applied. Note that, since a configuration of the image processing apparatus (image capturing apparatus) of the second exemplary embodiment and basic processing of shine correction thereof are the same as those of the above-described first exemplary embodiment, description thereof and illustration of the configuration will be omitted.

Figure 12:
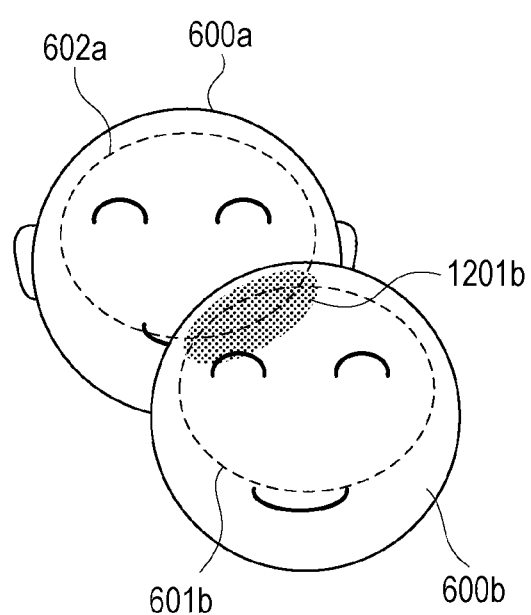
FIG. 12 is a view illustrating an example of a case where a shine region is larger than an overlapping region.

FIG. 12 illustrates an example in which, in a case where the shine correction regions 602a and 602b of the face regions 600a and 600b exemplified in FIG. 6 overlap, a shine region 1201b is generated in most of the overlapping region. In the case where the shine region 1201b is generated in most of the overlapping region in this manner, it is difficult to extract a skin color of a part in the overlapping region, in which shine is not caused, so that is difficult to perform processing using color information as described in the first exemplary embodiment.

Then, in a case of the second exemplary embodiment, by using a live image that is periodically captured for image confirmation and displayed on the monitor device 110, judgment of color information of the overlapping region is performed before capturing a still image. Since being periodically captured and displayed, the live image is generally captured without performing strobe light emission, so that there is a high possibility that shine is not caused.

In the case of the second exemplary embodiment, the image processing apparatus detects the color information of the overlapping region and color information of a cheek part of each of the face regions from an image captured as an image for display (live image) immediately before photographing a still image. Specifically, similarly to a case of detecting color information from a still image, block division is performed and block integral values are obtained, and an average signal of blocks of the overlapping region and regions of the cheek parts of the face regions is acquired.

At a time of judging to which face region the overlapping region belongs, the same block as that of the still image may be simply used, but a position is slightly deviated due to a time lag between the image for display and the still image to be photographed in some cases. Accordingly, in a case of photographing a still image, calculation of each of the blocks of the both cheeks and the overlapping region is performed again by using a face detection result of the image for display. Then, by using color information of each of the regions, which is acquired from the image for display, a difference of colors between each of the face regions and the overlapping region is obtained by the above-described formula (1) or the like, and it is judged that the overlapping region belongs to a face region in which the difference of the colors is the smallest. Note that, also in the case of the second exemplary embodiment, similarly to the first exemplary embodiment, judgment which is combined with judgment by using the distance information and the organ information may be performed. Moreover, also in the second exemplary embodiment, similarly to the first exemplary embodiment, calculation, adjustment, or the like of a correction amount by using a weight average (tint of the middle) of skin colors may be performed.

According to the second exemplary embodiment, even in a case where most of an overlapping region becomes a shine region, for example, as in a case where strobe light emission is performed to photograph a still image, it is possible to judge to which face region the overlapping region belongs. Therefore, also in the second exemplary embodiment, it is possible to perform shine correction with proper tint and suppress a bad influence caused by correction with erroneous tint.

As above, suitable exemplary embodiments of the invention have been described, but the invention is not limited to the exemplary embodiments, and various modifications and changes are allowed within a range of the gist.

Although the example in which the shine correction processing is performed for a skin color region of a face region has been described in the above-described exemplary embodiments, the invention is not limited to the shine correction processing of a skin color region of a face image. For example, in a case where an object is a car, the invention is applicable to shine correction or the like for a high-luminance region of a car body thereof or the like, and, in this case, a plurality of cars overlap, to an image region of which car the overlapping region belongs is able to be judged, and shine correction is able to be performed with proper tint.

The invention is able to be realized also by processing in which a program that realizes one or more functions of the above-described exemplary embodiments is supplied to a system or an apparatus via a network or a storage medium and one or more processors in a computer of the system or the apparatus reads out and executes the program. Moreover, the invention is able to be realized by a circuit (for example, an ASIC) that realizes one or more functions of the above-described exemplary embodiments.

Any of the above-described exemplary embodiments is merely described as a specified example for carrying out the invention, and should not be interpreted to limit a technical scope of the invention. That is, the invention is able to be carried out in various forms without departing from technical idea or principal features thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-107875 filed May 31, 2017, which is hereby incorporated by reference herein in its entirety.

What is claimed is:

1. An image processing apparatus comprising:
a detecting unit configured to detect a predetermined image region of an object from a photographed image;
a generation unit configured to generate a correction parameter; and
a correction unit configured to correct a high-luminance region by using the correction parameter, wherein
in a case where the high-luminance region is in an image region having a predetermined image region of a plurality of objects overlapping with each other therein, the generation unit judges to which object having the predetermined image region the high-luminance region belongs, and generates, on a basis of information of the predetermined image region the high-luminance region belongs to, the correction parameter with which the high-luminance region in the overlapping image region is corrected,
wherein the generation unit judges to which object having the predetermined image region the high-luminance region belongs on a basis of distance information from a photographing apparatus that photographs an image to the object having the predetermined image region.

2. The image processing apparatus according to claim 1, wherein the generation unit judges that the high-luminance region belongs to the predetermined image region of the object having the distance information to the photographing apparatus of which is shortest among those of the plurality of objects corresponding to the overlapping image region.

3. The image processing apparatus according to claim 1, wherein the generation unit sets a degree of reliability according to a difference in the distance information between the plurality of objects corresponding to the overlapping image region, and judges the predetermined image region of which object the high-luminance region belongs, on a basis of the degree of reliability according to the difference in the distance information.

4. The image processing apparatus according to claim 3, wherein the generation unit sets a target value of correction for the high-luminance region of the overlapping image region on a basis of the degree of reliability for each of the predetermined image regions of the plurality of objects corresponding to the overlapping image region.

5. The image processing apparatus according to claim 4, wherein the generation unit sets, as the target value of the correction, predetermined color information of an image region having the highest degree of reliability among degrees of reliability of the predetermined image regions of the plurality of objects corresponding to the overlapping image region, and generates the correction parameter on a basis of the target value.

6. The image processing apparatus according to claim 1, wherein
the detecting unit detects an image region of a face of a person as the predetermined image region of the object, and
the correction unit generates the correction parameter with which the high-luminance region in a skin color region of the image region of the face is corrected.

7. An image processing apparatus comprising:
a detecting unit configured to detect a predetermined image region of an object from a photographed image;
a generation unit configured to generate a correction parameter; and
a correction unit configured to correct a high-luminance region by using the correction parameter,
wherein in a case where the high-luminance region is in an image region having a predetermined image region of a plurality of objects overlapping with each other therein, the generation unit judges to which object having the predetermined image region the high-luminance region belongs, and generates, on a basis of information of the predetermined image region the high-luminance region belongs to, the correction parameter with which the high-luminance region in the overlapping image region is corrected;
wherein the generation unit judges an image region of which object the high-luminance region belongs, on a basis of information of a plurality of parts that constitute the object.

8. The image processing apparatus according to claim 7, wherein the generation unit judges that the high-luminance region belongs to, among the plurality of objects corresponding to the overlapping image region, the predetermined image region of an object in which information of all of the plurality of parts is acquired.

9. The image processing apparatus according to claim 7, wherein the generation unit sets a degree of reliability according to information of each of the parts, which is to be acquired from each of the predetermined image regions of the plurality of objects corresponding to the overlapping region, and judges the predetermined image region of which object the high-luminance region belongs, on a basis of the degree of reliability of the information of the parts.

10. The image processing apparatus according to claim 7, wherein
the detecting unit detects an image region of a face of a person as the predetermined image region of the object, and
the correction unit generates the correction parameter with which the high-luminance region in a skin color region of the image region of the face is corrected.

11. An image processing apparatus comprising:
a detecting unit configured to detect a predetermined image region of an object from a photographed image;
a generation unit configured to generate a correction parameter; and
a correction unit configured to correct high-luminance region by using the correction parameter,
wherein in a case where the high-luminance region is in an image region having a predetermined image region of a plurality of objects overlapping with each other therein, the generation unit judges to which object having the predetermined image region the high-luminance region belongs, and generates, on a basis of information of the predetermined image region the high-luminance region belongs to, the correction parameter with which the high-luminance region in the overlapping image region is corrected;

wherein, in a case where the photographed image is an image photographed with strobe light emission, the generation unit generates, on a basis of information of the overlapping image region and the predetermined image region of the object in an image acquired at a time of periodical photographing before photographing with the strobe light emission, the correction parameter with which the high-luminance region of the overlapping image region in the image photographed with the strobe light emission is corrected.

12. The image processing apparatus according to claim 11, wherein the detecting unit detects an image region of a face of a person as the predetermined image region of the object, and the correction unit generates the correction parameter with which the high-luminance region in a skin color region of the image region of the face is corrected.

13. An image processing method of an image processing apparatus, the method comprising:

detecting a predetermined image region of an object from a photographed image;

generating a correction parameter; and correcting a high-luminance region by using the correction parameter, wherein in a case where the high-luminance region is in an image region having a predetermined image region of a plurality of objects overlapping with each other therein, to which object having the predetermined image region the high-luminance region belongs is judged, and, on a basis of information of the predetermined image region the high-luminance region belongs to, the correction parameter with which the high-luminance region in the overlapping image region is corrected is generated, and judging to which object having the predetermined image region the high-luminance region belongs on a basis of distance information from a photographing apparatus that photographs an image to the object having the predetermined image region.

14. A non-transitory computer-readable storage medium storing a program for causing a computer to execute following steps comprising:

detecting a predetermined image region of an object from a photographed image;

generating a correction parameter; and correcting a high-luminance region by using the correction parameter, wherein in a case where the high-luminance region is in an image region having a predetermined image region of a plurality of objects overlapping with each other therein, to which object having the predetermined image region the high-luminance region belongs is judged, and, on a basis of information of the predetermined image region the high-luminance region belongs to, the correction parameter with which the high-luminance region in the overlapping image region is corrected is generated, judging to which object having the predetermined image region the high-luminance region belongs on a basis of distance information from a photographing apparatus that photographs an image to the object having the predetermined image region.

* * * * *